United States Patent
Ernst et al.

[11] 4,030,191
[45] June 21, 1977

[54] DEVICE FOR LINEARLY GUIDING A MACHINE ELEMENT

[75] Inventors: Horst M. Ernst, Eltingshausen; Armin Olschewski, Schweinfurt; Manfred Brandenstein, Aschfeld, all of Germany

[73] Assignee: SKF Industrial Trading and Development Company, B.V., Nieuwegein, Netherlands

[22] Filed: Mar. 4, 1976

[21] Appl. No.: 663,725

[30] Foreign Application Priority Data
Mar. 15, 1975 Germany .......................... 7508272

[52] U.S. Cl. .............................................. 308/6 C
[51] Int. Cl.² ...................................... F16C 29/12
[58] Field of Search ........................... 308/6 R, 6 C

[56] References Cited
UNITED STATES PATENTS

| | | |
|---|---|---|
| 3,449,927 | 6/1969 | Field et al. .................... 308/6 C X |
| 3,511,545 | 5/1970 | Brettrager ........................ 308/6 C |
| 3,547,502 | 12/1970 | Howard ............................. 308/6 C |
| 3,552,806 | 1/1971 | Weasler et al. ................... 308/6 C |
| 3,940,186 | 2/1976 | Nilsson ............................ 308/6 C |

Primary Examiner—Joseph E. Peters, Jr.
Assistant Examiner—Gene A. Church
Attorney, Agent, or Firm—Daniel M. Rosen

[57] ABSTRACT

A machine element is guided for linear movement along an I-beam by means of two endless rows of rolling elements on each side of the beam. The raceways for the roll bodies under load extend along the inner edges of the flanges of the beam, the raceways being positioned so that the force action lines on the roll bodies in the two raceways on each side of the beam converge in a direction away from the respective side of the beam.

15 Claims, 6 Drawing Figures

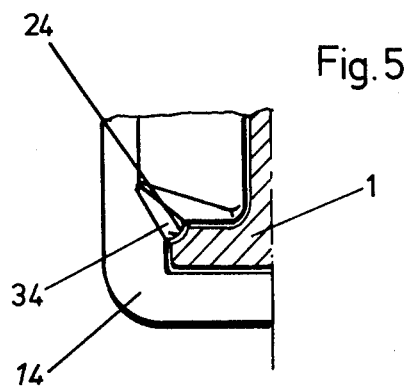
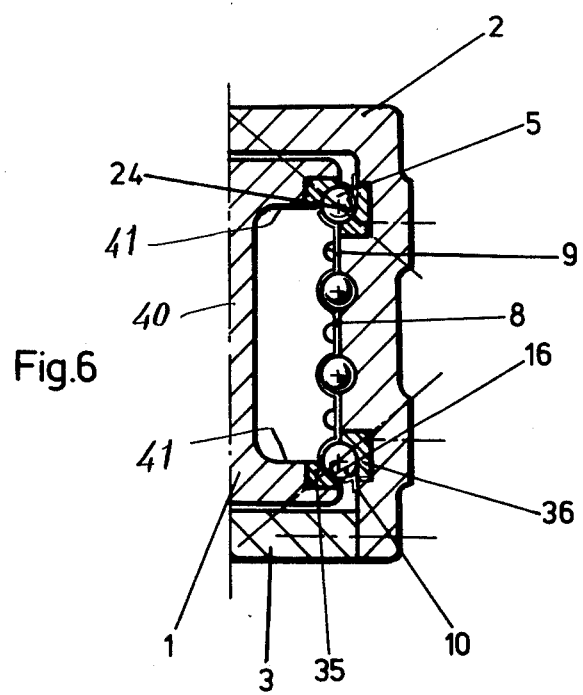

DEVICE FOR LINEARLY GUIDING A MACHINE ELEMENT

THE INVENTION

This invention relates to a device for linearly guiding a machine element along a beam, and is particularly directed to such a device employing two rows of endlessly circulating roll bodies on each of the two sides of the longitudinal median plane of the beam.

Guiding devices are known in which the ball bearings of two rows of endlessly circulating roll bodies such as ball elements contact the beam at each side of its longitudinal median plane in such a way that the line of action of the forces of the loaded roll bodies of the two rows diverge in the direction away from the respective side of the beam. These devices have the disadvantage that the machine element is held on the beam with a relatively weak resistance to twisting, since the force action lines converge inwardly, and the effective support length of these force action lines is small. In many cases, this is not acceptable. In addition, the machine element requires a considerable space surrounding the beam, since the roll bodies of each row, which are not under load, lie outwardly of the beam, relative to the loaded roll bodies, and must be accommodated there in a machine element. Accordingly, as a result of greater expense for materials and manufacture, the above device is relatively expensive.

According to the present invention, these disadvantages are overcome by providing a beam having a cross-section in the shape of a double T, in other words, an I-beam. The inner edge of the flanges of this beam form the raceways or roll paths for loaded roll bodies. The roll paths are positioned so that the force action lines of the ball bearings of the two rows of roll bodies on each side of the longitudinal median plane of the beam, and which run in the roll paths of the beam, converge in the direction outwardly of the respective side of the beam. Accordingly, the force action lines of these two rows diverge towards the side of the beam and, in the transverse plane perpendicular to the longitudinal median plane, form an effective support length which is greater than the distance separating the loaded roll bodies of the one row from those of the other row. As a result, the machine element is stiffly mounted on the beam, and moments of force which revolve about the axis of the beam can be absorbed without overloading the roll bodies.

According to one embodiment of the invention, the machine element is comprised of two components arranged on opposite sides of the longitudinal median plane of the beam. Each component carries two rows of roll bodies. The two components are rigidly connected with one another by bolts or the like.

According to a further feature of the invention, means for adjustment are provided for adjusting the lateral distance between the two components of the machine element, so that the lateral clearance or the initial tension between the loaded roll bodies of the machine element can be adjusted or regulated and adapted to the operating conditions. For the purposes of adjustment, headless screws can be used, which are screwed into a lateral support surface of a first component. The screws have bearing surfaces or the like, which support the corresponding second component of the machine element at the desired distance from the first component.

A high degree of stiffness of the machine element is achieved according to a further feature of the invention in which each component of this element has a lateral portion parallel to the longitudinal median plane of the beam, and an end portion, adjoining one end of the respective lateral portion and extending across the beam to the laterally opposite component, whereby a box-shaped machine element having a high degree of resistance to deformation is formed.

According to a further feature of the invention, a holding plate is fastened to the inner wall of each of the two components of a machine element, and a frame cover is affixed to each longitudinal end of the machine element. The linear channels for the roll bodies can thereby be formed between the holding plate and the inner wall of the component, and the channels of the reversing zone can be formed between the holding plate and a bore hold in the frame cover. The frame cover may be made of an elastic plastic material and have sealing lips constructed of one piece, which prevent penetration of harmful dirt particles between machine elements and beam into the interior of the machine element. Hardened roll path elements can moreover be fastened in the beam or on the components of the machine element. These elements form the roll paths for the loaded roll bodies. As a result, the beam and the components which may be economically constructed, for example, of easily workable mild steel, cast iron or aluminum.

The device of the invention moreover has the advantage that it can be constructed compactly and with savings of space, since the two rows of roll bodies on each side of the beam are accommodated between the flanges of the I-beam, and since the machine element surrounds the beam with a minimum structural width and height.

In order that the invention will be more clearly understood, it will now be disclosed in greater detail with reference to the accompanying drawings, wherein:

FIG. 5 is a cross-sectional view of the device of FIG. 1, taken along the lines V—V; and FIG. 6 is a cross-sectional view of a portion of a further modification of the device of the invention, taken on one side of the longitudinal median plane of the device.

Figure 1:
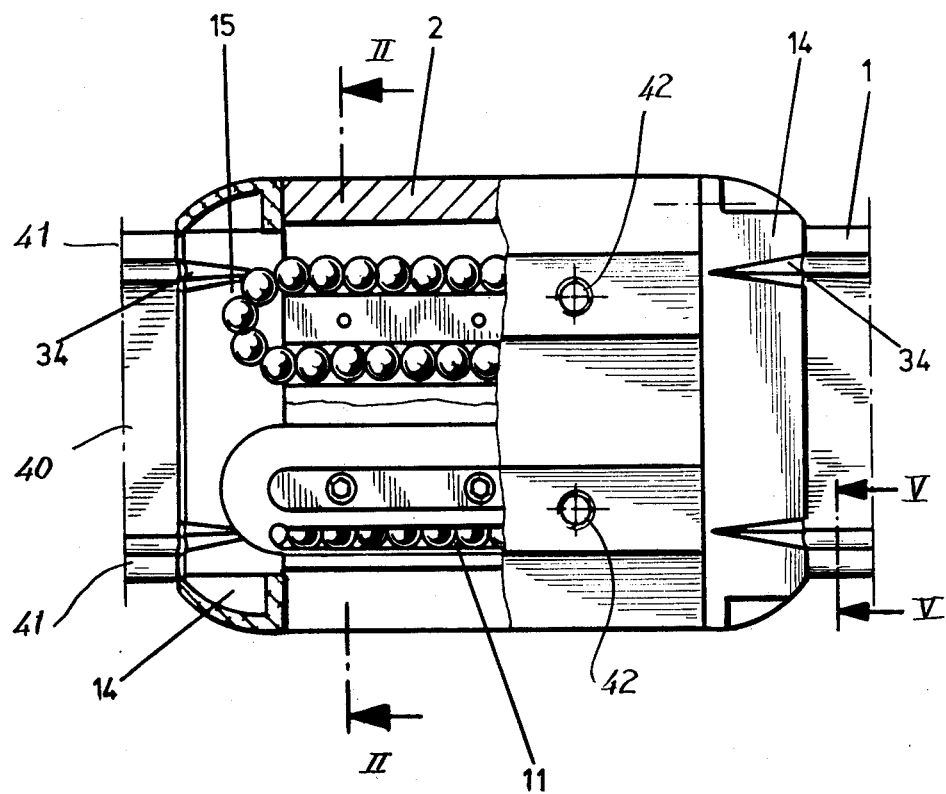
FIG. 1 is a partially cross-sectional side view of one embodiment of a guiding device in accordance with the invention.
Figure 2:
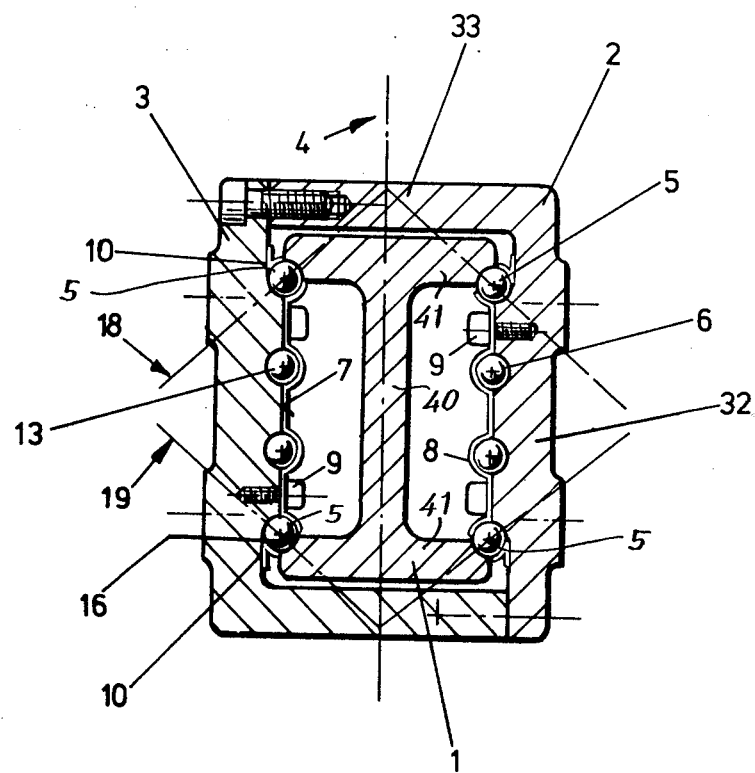
FIG. 2 is a cross-sectional view of the device of FIG. 1, taken along the lines II—II of FIG. 1.

Referring now to the drawings and more in particular to FIGS. 1 and 2, in accordance with the invention, the guiding beam 1 is an I-beam, that is, it has a double T-shaped cross-section. The beam 1 has a central section or web 40, with a flange 41 on each end thereof, each of the flanges extending to each side of the longitudinal median plane 4 of the beam. The machine element which is guided by the beam is comprised of a pair of components 2 and 3 adjacent the flanges 41 on opposite sides of the plane 4.

A roll path for roll bodies 5 under load is provided between the components of the machine element and the inner edge of each flange of the beam on each side of the longitudinal plane 4, so that two roll paths for the roll bodies under load are provided on each side of the plane 4. The machine element comprises means for defining a roll path for roll bodies 6 not under load and corresponding to separate roll paths for roll bodies under load, so that each pair of paths for roll bodies under load 5 and roll bodies not under load 6 defines a bearing race or roll path. The roll bodies, as shown, are preferably ball elements.

The roll bodies are held against the inner walls 7 of the components 2 and 3 by holding plates 8 of a strip of material, such as a metal strip. The holding plates 8 are held to the inner walls by suitable means, such as bolts 9. The plates 8 have longitudinally extending slits 11 on the sides thereof towards the flanges, to define linear channels 10 for the roll bodies 5 under load, and the plates 8 define closed linear channels 13 for the roll bodies 6 not under load. These channels are formed between the holding plate 8 and the corresponding component 2, 3.

A frame cover 14, for example, of an elastic plastic material and made by an injection molding process, is screwed to each longitudinal end of the machine element. Reversing channels 15 are formed between the holding plates 8 and the frame cover 14, the reversing channels joining the respective ends of the linear channels 10 and 13 for each endless row of roll bodies, so that the linear channel 10 for roll bodies 5 under load is joined with a corresponding linear channel 13 for roll bodies 6 not under load.

The roll bodies 5 under load run on the inner edge of the corresponding flange of beam 1 in a ball-bearing roller path 16. In so doing, the force action lines 18 of the one row and the force action lines 10 of the second row on the same side of beam 1, are so aligned, that they converge in the direction away from the plane 4. The roll bodies 5 under load of the four rows of a machine element form with the force action lines 18, 19 - as can be seen in FIG. 2 — a stiff 0 arrangement with relatively large effective support lengths. The channels 10, 13, 15 of the two rows of a component 2, 3 are positioned to lie in a plane that is parallel to the longitudinal median axis 4 of the beam, so that the rows of roll bodies are effectively positioned between the flanges 41.

The components 2, 3 may be provided with threaded holes 42 or the like on their external surfaces, in order to enable mounting of other elements thereto, such as rod-elements (not shown) to be supported and guided with the machine element.

Figure 3:
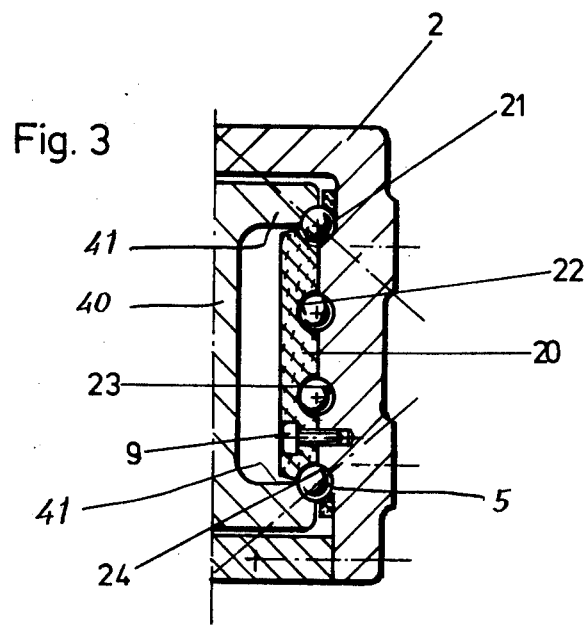
FIG. 3 is a cross-sectional view of a portion of a guiding device in accordance with another embodiment of the invention, on one side of the longitudinal median plane of the beam.

In FIG. 3, instead of the holding plate 8 made of strip material of FIGS. 1 and 2, a holding plate 20 of plastic is fastened to component 2 by bolts 9, the holding plate 20 having guide channels 21, 22. Each guide channel 22 forms, together with an opposite guide channel 23 of the component 2, the linear channel 13 of the roll bodies 6 not under load and each guide channel 21, together with a rounded shoulder 24 of component 2, forms a channel 10 of the roll bodies 5 under load.

Figure 4:
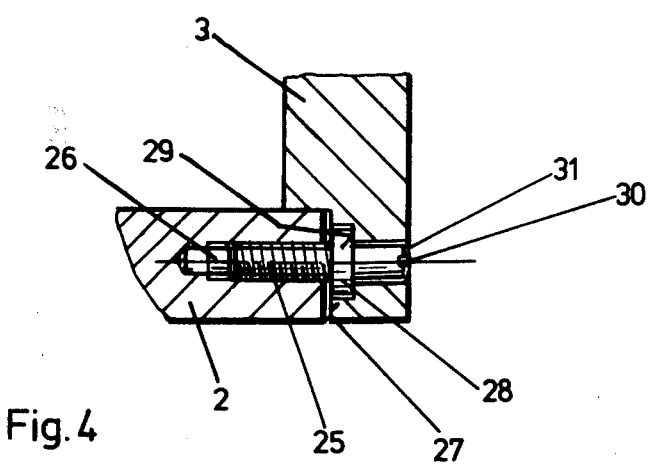
FIG. 4 is an enlarged cross-sectional view of a portion of the device of FIG. 1 and illustrating a manner for adjusting the lateral distance between the two components of the device.

Means for adjusting the distance between the two components 2, 3 are illustrated in FIG. 4. In this arrangement a headless screw 25 is screwed into a screw hole 26 of the lateral support surface of component 2. This headless screw 25 has a bearing shoulder 28 against which the support surface 29 of component 3, which lies opposite the lateral support surface 27, supports itself. By varying the extent to which two headless screws 25, which are arranged at the longitudinal end of the machine element, are screwed in, the relative distance between the components 2, 3 can be so adjusted that the desired initial tension or the desired clearance of the roll bodies 5 under load between arm 1 and the machine element can be adjusted.

The adjustment is made with a screw driver, which grips into a slit 30 of the headless screw 25. An opening 31 is provided in the wall of component 3, opposite the headless screw 25. For the adjustment, a screw driver can be passed through this opening 31, so that the adjustment can be effected, without first loosening and separating component 3 from component 2. Suitable conventional means, such as bolts (not shown) are provided to hold the components 2 and 3 together.

As can be seen in FIG. 2, each component 2, 3 has a lateral position 32 extending parallel to the longitudinal median plane 4 of beam 1 and an end portion 33, that joins the end of the respective lateral portion and extends laterally across the beam to the opposite component 2, 3, so that a stiff machine element is formed by the two components 2, 3, and the components 2, 3 box in beam 1.

The frame cover 14, as seen in FIGS. 1 and 5, has one piece sealing lips 34 at the inner edge thereof joining beam 1, the lips 34 sliding on the roll path 16 of beam 1 and to form a seal therebetween.

FIG. 6 shows a modification of the device of the invention in which a hardened roll path element 35 with a roll path 16 is embedded in each flange of beam 1 and an opposed, hardened roll path element 36 with a roll path 24 is embedded in the inner wall of the element 2. These roll paths 16, 24 form the linear channel 10 for the roll bodies 5 under load. The hardened, abrasion-resistant roll path elements 35 can, for example, be made of steel and fastened to beam 1 by gluing, soldering or with screws (not shown). The hardened roll path elements 36 can equally well be fastened to components 2, 3 by gluing or soldering or may be held with the holding plate 8 by the bolts 9. The device can be economically joined by manufacturing the beam 1 and the components 2 and 3 of the machine element from nonhardenable material, for example, in a die-cast process from aluminum. Worn roll path elements 35, 36 can thereby economically be replaced by new roll path elements 35, 36 without having to replace the whole beam 1 or the components 2, 3.

The invention is, of course, not limited to the forms of construction disclosed herein. For example, rod-shaped roll path elements or such elements provided with roll path channels (not shown) can be inserted in corresponding grooves of the components, which together with the opposite guide channels of the holding plate, form the linear channels for the roll bodies not under load. It is therefore intended in the following claims to cover each such variation and modification which falls within the true spirit and scope of the invention.

What is claimed is:

1. In a device for linearly guiding a machine element along a beam, wherein the beam and machine element define paths for two endless rows of circulating roll bodies on each side of the longitudinal median plane of the beam, the improvement wherein said beam has a center section joining a pair of end flanges, each end flange extending laterally of the beam on both sides of said longitudinal median plane, said machine element being positioned adjacent said flanges, a separate roll path for roll bodies under load being formed between said machine element and the inner edge of each said flange, said roll paths being positioned so that the force action lines on said roll bodies in the two roll paths on each side of the longitudinal median plane converge in the direction away from the respective side of said longitudinal median plane.

2. The device of claim 1, wherein said machine element is comprised of first and second components positioned adjacent opposite sides of said beam, and further comprising means for holding said first and second components together.

3. The device of claim 2, further comprising means for adjusting the relative distance between said first and second components of said machine element.

4. The device of claim 3, wherein said first component has a lateral support surface and said second component has an opposite support surface adjacent said lateral support surface, said means for adjusting comprising a plurality of headless screws threaded into said lateral support surface, said screws having bearing shoulders spaced from said lateral support surface, said second component being positioned with said opposite support surface supported on said bearing shoulders.

5. The device of claim 4, wherein said second component has holes extending through said opposite surface, the ends of said screws away from said lateral support surface extending through said holes to enable adjustment of said screws.

6. The device of claim 2, wherein each said component has a lateral portion extending parallel to said longitudinal median plane, and an end portion connected to one end of the respective lateral portion and extending laterally of said plane to the other component, and means connecting the lateral portion of each component to the end portion of the other component.

7. The device of claim 1, further comprising a separate row of roll bodies not under load joining the ends of each said row of roll bodies under load, said machine element being comprises of at least one component adjacent the flanges of said beam, said component having an inner wall toward said beam, and further comprising holding plate means affixed to said inner wall of said component for holding the rows of roll bodies under load and rows of roll bodies not under load against said inner wall.

8. The device of claim 1, further comprising a frame cover affixed to each longitudinal end of said machine element.

9. The device of claim 8, wherein said frame covers are of an elastic plastic material and have sealing lips at their inner edges engaging said beam.

10. The device of claim 9, wherein said frame covers are injection molded and said sealing lips are formed integrally therewith.

11. The device of claim 8, wherein said machine element is comprised of at least one component adjacent the flanges of said beam and having an inner wall facing said beam, a holding plate affixed to said inner wall for holding roll bodies against said inner wall and defining a linear channel for roll bodies under load and a linear channel for roll bodies not under load, and further comprising reversing channels between said holding plate and said frame cover defining reversing channels interconnecting said linear channels.

12. The device of claim 11, wherein said component has a lateral section on each side of said beam, said linear channels for roll bodies under load being positioned at the ends of the lateral section on each of said beam, and the corresponding linear channels for roll bodies not under load being between the respective linear channels for roll bodies under load.

13. The device of claim 12, wherein the channels for roll bodies under load, the respective channels for roll bodies not under load, and the respective reversing channels are in planes parallel to said longitudinal median plane.

14. The device of claim 1, wherein said machine element comprises at least one component positioned adjacent said beam and having an inner wall facing said flanges, and further comprising a hardened roll path element affixed to each flange for defining the respective roll path for roll bodies under load.

15. The device of claim 1, wherein said machine element comprises at least one component adjacent said beam and having an inner wall facing said flanges, and further comprising hardened roll path elements affixed to the inner wall of said component and defining roll paths for roll bodies under load.

* * * * *